(12) United States Patent
Dreifus et al.

(10) Patent No.: US 11,449,881 B2
(45) Date of Patent: Sep. 20, 2022

(54) ACCOUNTABILITY AND SATISFACTION METRICS, ETHICAL STANDARDS, AND THEIR METHODS OF USE

(71) Applicant: Strategic Communications Group Inc., New York, NY (US)

(72) Inventors: Shirley Dreifus, New York, NY (US); Farhan Ali, New York, NY (US)

( * ) Notice: Subject to any disclaimer, the term of this patent is extended or adjusted under 35 U.S.C. 154(b) by 319 days.

(21) Appl. No.: 15/389,972

(22) Filed: Dec. 23, 2016

(65) Prior Publication Data
US 2017/0109765 A1 Apr. 20, 2017

Related U.S. Application Data

(63) Continuation-in-part of application No. 13/492,826, filed on Jun. 9, 2012, now abandoned.
(Continued)

(51) Int. Cl.
G06Q 30/00 (2012.01)
G06Q 30/02 (2012.01)
G06Q 10/06 (2012.01)

(52) U.S. Cl.
CPC ..... G06Q 30/0203 (2013.01); G06Q 10/0637 (2013.01); G06Q 30/02 (2013.01)

(58) Field of Classification Search
CPC ........... G06Q 30/0255; G06Q 30/0235; G06Q 10/105; G06Q 10/103; G06Q 10/067;
(Continued)

(56) References Cited

U.S. PATENT DOCUMENTS 8,301,482 B2 * 10/2012 Reynolds ............... G06Q 10/06
705/7.29
2004/0172323 A1 * 9/2004 Stamm ................... G06Q 30/02
705/7.32
(Continued)

FOREIGN PATENT DOCUMENTS

WO WO-2009102728 A1 * 8/2009 ....... G06Q 10/06311

OTHER PUBLICATIONS

Gamelas et al., Hotel Guests' Participation on the Facebook Platform of International Hospitality Brands-Complaint Analysis and Customer Satisfaction, https://repositorio-aberto.up.pt/bitstream/10216/79430/2/35586.pdf, University of Porto, Dissertation, Master in Management, 2015 (Year: 2015).*

*Primary Examiner* — Patricia H Munson
*Assistant Examiner* — Uche Byrd
(74) *Attorney, Agent, or Firm* — Sandra Poteat Thompson; Finlayson Toffer

(57) ABSTRACT

Computer-implemented methods for providing real-time customer, patient or accountability, security, consumer and employee metrics include: providing at least one strategic goal; providing at least one metric associated with the at least one strategic goal; providing at least one communication channel between a customer and a company; providing at least one communication code; utilizing the at least one communication code to access the at least one communication channel; providing a survey tool to the customer using the at least one communication channel; capturing data from the survey tool in a database; converting the captured data to the at least one metric; and providing the at least one metric on a dashboard application. An executable software application that implements the computer-implemented method disclosed is also contemplated.

9 Claims, 5 Drawing Sheets

Related U.S. Application Data

(60) Provisional application No. 61/494,989, filed on Jun. 9, 2011.

(58) Field of Classification Search
CPC .. G06Q 30/02; G06Q 10/06315; G06Q 40/00; G06Q 30/00; G06Q 30/06; G06Q 30/0203; G06Q 10/0637; H04Q 7/20
See application file for complete search history.

(56) References Cited

U.S. PATENT DOCUMENTS

| | | | |
|---|---|---|---|
| 2007/0127693 A1* | 6/2007 | D'Ambrosio | G06Q 10/10 379/265.06 |
| 2008/0097850 A1* | 4/2008 | Kristal | G06Q 30/02 705/14.27 |
| 2009/0204470 A1* | 8/2009 | Weyl | G06Q 10/06 705/7.13 |
| 2012/0158414 A1* | 6/2012 | Watford | G06Q 10/105 705/1.1 |

* cited by examiner

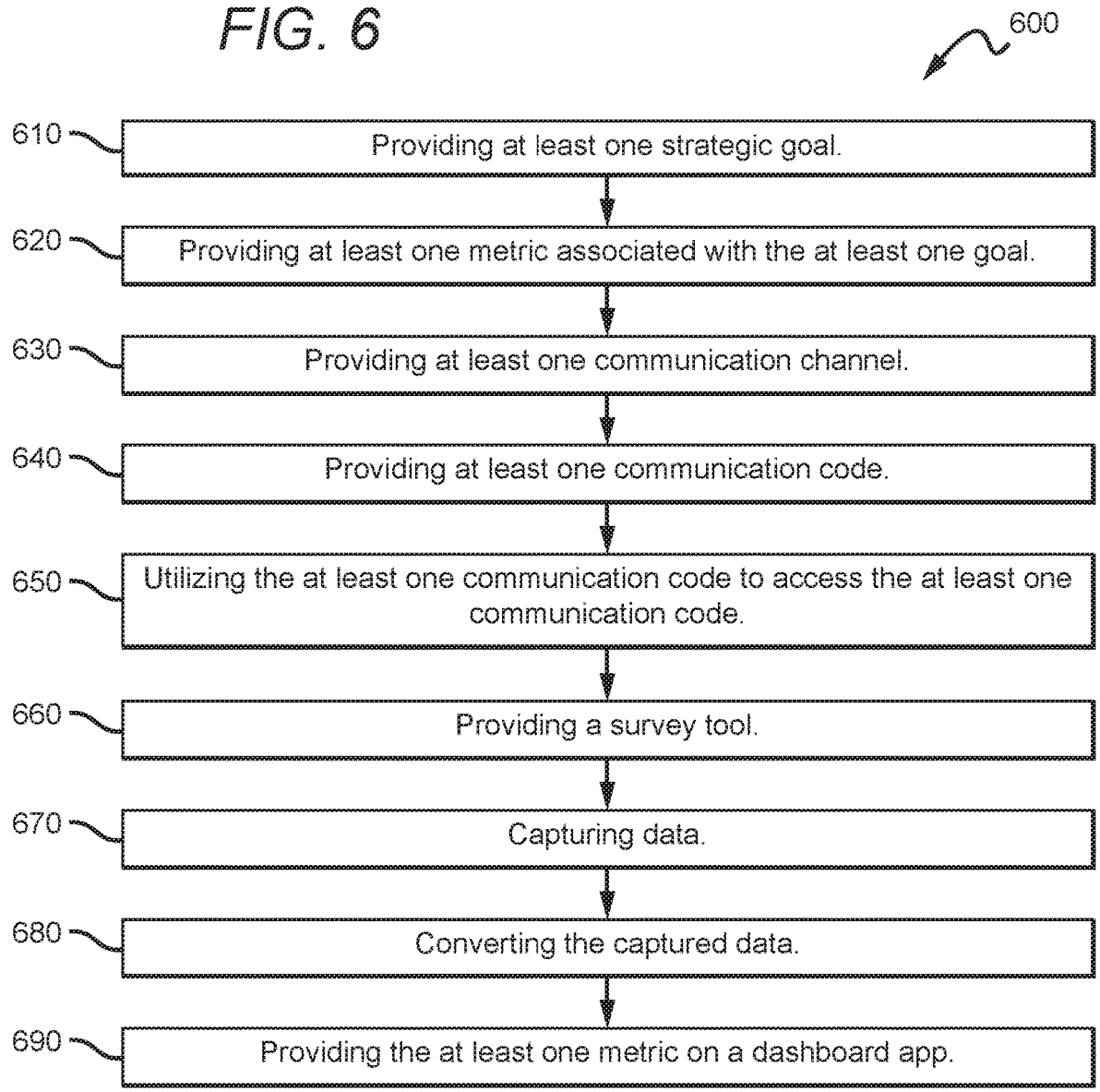

Figure 7 computer program products stored in a computer readable medium for providing real-time customer, patient or consumer metrics and employee metrics include: 700

↓ computer code for inputting at least one strategic goal; 710

↓ computer code for inputting at least one metric associated with the at least one strategic goal; 720

↓ computer code for collecting network communications data from at least one communication channel between a customer and a company; 730

↓ computer code for implementing a survey tool application, terminal or device to the customer using the at least one communication channel, wherein the survey tool is saved on, executed from or on, stored on or located on a portable media storage device, a hand held device, a tablet computer, a laptop computer, a desk top computer, a network service, an internet server, the cloud or a combination thereof; 740

↓ computer code to capture data corresponding to actual use of survey tools to access accountability queries, satisfaction queries and security queries; wherein captured data from the survey tool in a database is saved on, executed from or on, stored on or located on a portable media storage device, a hand held device, a tablet computer, a laptop computer, a desk top computer, a network service, an internet server, the cloud or a combination thereof; 750

↓ computer code for completing a plurality of data records from the survey tools to produce a dashboard application that shows real-time information and metrics related to the accountability query, security query, customer satisfaction, the employee satisfaction and the at least one strategic goal, wherein the customer satisfaction information and the employee satisfaction information are derived directly from a specific customer and a specific employee interaction with one another, and 760

↓ wherein the dashboard application is saved on, executed from or on, stored on or located on a portable media storage device, a hand held device, a tablet computer, a laptop computer, a desk top computer, a network service, an internet server, the cloud or a combination thereof; 770

↓ a computer-implemented executable software application, comprising providing real-time customer, patient or consumer metrics and employee metrics on the dashboard application, wherein the software application is saved on, executed from or on, stored on or located on a non-transitory computer readable medium, including a portable media storage device, a hand held device, a tablet computer, a laptop computer, a desk top computer, a network service, an internet server, the cloud or a combination thereof; 780

↓ wherein the software application is utilized to convert the captured data to the at least one metric; and providing at least one reward tool for the at least one customer, providing at least one reward tool for an at least one individual employee of the company, wherein the reward tool for the at least one individual employee is directly related to the individual employee's satisfaction or accomplishment, and 790

↓ wherein the at least one reward tool for the at least one customer is related to the at least one reward tool for the at least one employee. 800

ACCOUNTABILITY AND SATISFACTION METRICS, ETHICAL STANDARDS, AND THEIR METHODS OF USE

This United States Continuation in Part Application is based on U.S. Utility patent application Ser. No. 13/492,826, which is based on U.S. Provisional Application Ser. No. 61/494,989 filed on Jun. 9, 2011 and entitled "Employee and Customer Loyalty and Rewards Programs, Satisfaction Metrics and Their Methods of Use", which is commonly-owned and incorporated herein in its entirety by reference.

FIELD OF THE SUBJECT MATTER

The field of the subject matter is accountability and satisfaction metrics, ethical standards, employee and customer loyalty systems, rewards programs, and their methods of use.

BACKGROUND

The recent banking scandals, including the Wells Fargo Account scandal, show in bright letters that accountability standards and ethical standards are important and should be strictly and diligently maintained. The only way to maintain those standards across multiple (sometimes hundreds or thousands) of locations is by utilizing hardware, electronic and software methods and systems. At this point, there are no acceptable methods or systems for consolidating, analyzing, presenting and internalizing this information across multiple locations or in organizations that have hundreds or thousands of employees with many more customers. It is clear that an organization as sophisticated as Wells Fargo either didn't want to know or didn't have the systems in place to realize the extent of their customer dissatisfaction or ethical breakdown until it was too late.

In addition, companies are always exploring ways to increase customer satisfaction, address customer needs, keep employees productive and satisfied with their work. In addition, companies and their marketing departments constantly explore methods to collect and analyze customer satisfaction metrics, in order to determine if current marketing and customer service methods and programs are effective.

Right now, companies are struggling to connect all of the customer feedback in real time, decipher what it means, apply it to employee and service reviews, while at the same time rewarding all of the high performers in the process, such as good employees and loyal customers. There are many systems that address part of the equation, but leave other issues out of the mix.

Reynolds et al. (U.S. Pat. No. 8,301,482) and D'Ambrosio et al (US Patent Publication 2007/0127693) provides customer rewards systems. Reynolds describes a reward tool and it includes customers and employees." However, it would be ideal to have an application that shows real-time information and metrics related to the customer satisfaction, the employee satisfaction and the at least one strategic goal, wherein the customer satisfaction information and the employee satisfaction information are derived directly from a specific customer and a specific employee interaction with one another. Reynolds doesn't contemplated this application.

There is nothing in the passages of Reynolds that refers to employees that specifically teaches or suggests the kind of information and metrics. Reynolds merely states that employee perceptions and understanding those perceptions helps a market analysis system. Nothing in Reynolds suggests gathering information that is derived directly from an interaction between a specific customer and specific employee.

D'Ambrosio does not view employee satisfaction from their perspective as a customer, but instead is viewed from the lens of their satisfaction in interacting with customers and managers. Employee satisfaction is not their satisfaction as a consumer or customer as defined by D'Ambrosio.

Systems are also lacking that show the input from a direct interaction with a customer or patient and an employee, staff member, doctor or nurse, along with providing direct rewards or incentives based on that direct interaction. Right now, there are systems in place where a customer can rate the transaction or fill out a survey that captures the experience of the transaction, but there are no systems in place to determine if the employee is trained and properly executing training based on the comments and feedback from the consumer that the employee just interacted with. This type of system would allow the manager or company pinpoint training to those employees who need it and reward those employees who are executing their training properly.

SUMMARY OF THE SUBJECT MATTER

Computer program products stored in a computer readable medium for providing real-time customer, patient or consumer metrics and employee metrics, are disclosed and include: computer code for inputting at least one strategic goal; computer code for inputting at least one metric associated with the at least one strategic goal; computer code for collecting network communications data from at least one communication channel between a customer and a company; computer code for implementing a survey tool application, terminal or device to the customer using the at least one communication channel, wherein the survey tool is saved on, executed from or on, stored on or located on a portable media storage device, a hand held device, a tablet computer, a laptop computer, a desk top computer, a network service, an internet server, the cloud or a combination thereof; computer code to capture data corresponding to actual use of survey tools to access accountability queries, satisfaction queries and security queries; wherein captured data from the survey tool in a database is saved on, executed from or on, stored on or located on a portable media storage device, a hand held device, a tablet computer, a laptop computer, a desk top computer, a network service, an internet server, the cloud or a combination thereof; computer code for completing a plurality of data records from the survey tools to produce a dashboard application that shows real-time information and metrics related to the accountability query, security query, customer satisfaction, the employee satisfaction and the at least one strategic goal, wherein the customer satisfaction information and the employee satisfaction information are derived directly from a specific customer and a specific employee interaction with one another, and wherein the dashboard application is saved on, executed from or on, stored on or located on a portable media storage device, a hand held device, a tablet computer, a laptop computer, a desk top computer, a network service, an internet server, the cloud or a combination thereof; a computer-implemented executable software application, comprising providing real-time customer, patient or consumer metrics and employee metrics on the dashboard application, wherein the software application is saved on, executed from or on, stored on or located on a non-transitory computer readable medium, including a portable media storage device, a hand held device, a tablet computer, a laptop computer, a desk top computer, a network service, an internet server, the cloud or a combination thereof; wherein the software application is utilized to convert the captured data to the at least one metric; and providing at least one reward tool for the at least one customer, providing at least one reward tool for an at least one individual employee of the company, wherein the reward tool for the at least one individual employee is directly related to the individual employee's satisfaction or accomplishment, and wherein the at least one reward tool for the at least one customer is related to the at least one reward tool for the at least one employee.

Computer-implemented methods for providing real-time customer, patient or consumer and employee metrics include: providing at least one strategic goal; providing at least one metric associated with the at least one strategic goal; providing at least one communication channel between a customer and a company; providing at least one communication code; utilizing the at least one communication code to access the at least one communication channel; providing a survey tool to the customer using the at least one communication channel; capturing data from the survey tool in a database; converting the captured data to the at least one metric; and providing the at least one metric on a dashboard application.

A software application that implements the computer-implemented method disclosed is also contemplated. Specifically, a computer-implemented executable software application is included that comprises providing real-time customer, patient or consumer metrics and employee metrics on a dashboard application.

BRIEF DESCRIPTION OF THE FIGURES

FIG. 6 shows a contemplated method.

FIG. 7 shows a contemplated method.

DETAILED DESCRIPTION

Figure 1:
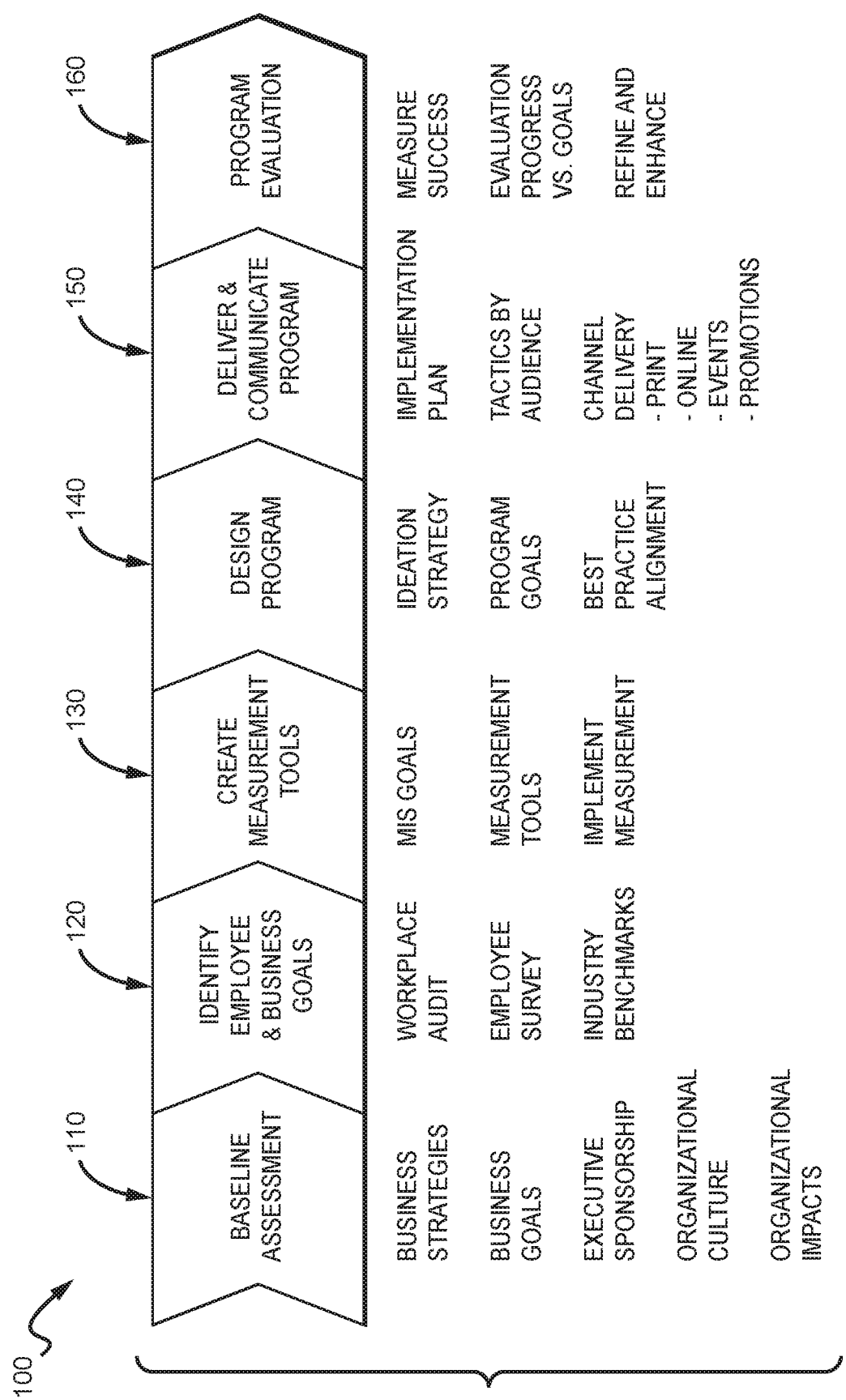
FIG. 1 is an outline of a contemplated process.

Contemplated embodiments disclosed herein address recent banking scandals, including the Wells Fargo Account scandal, that was discussed earlier. The only way to maintain those standards across multiple (sometimes hundreds or thousands) of locations is by utilizing hardware, electronic and software methods and systems. At this point, there are no acceptable methods or systems for consolidating, analyzing, presenting and internalizing this information across multiple locations or in organizations that have hundreds or thousands of employees with many more customers. It is clear that an organization as sophisticated as Wells Fargo either didn't want to know or didn't have the systems in place to realize the extent of their customer dissatisfaction or ethical breakdown until it was too late.

An ideal system would be one that a) collected accountability and security metrics, b) helped to implement accountability and security standards, c) built and tracked customer loyalty, d) tracked customer satisfaction with employees, e) tracked company accomplishments against strategic goals, and f) opened communications channels for companies with customers. Additionally, ideal systems would track individual employee accomplishments and satisfaction, along with providing rewards and incentives for both employees and customers based on their interactions with one another.

To this end, a software platform and an accompanying methodology and metrics profile has been developed that meets all of these goals, including: a) tracking customer satisfaction with employees, b) tracking employee accomplishments against satisfaction goals, c) provides a basic level that provides customers and employees "thank yous", points and rewards with no tangible value, but instead opens up lines of communication and the ability to add on points with value and offerings for customers and employees, d) allowing customers and employees to "turn in" points for items, discounts on products or free products from a reward site, e) collecting accountability and security metrics, and f) helps to implement accountability and security standards.

Specifically and as shown in FIG. 7, computer program products stored in a computer readable medium for providing real-time customer, patient or consumer metrics and employee metrics, are disclosed and include 700: computer code for inputting at least one strategic goal 710; computer code for inputting at least one metric associated with the at least one strategic goal 720; computer code for collecting network communications data from at least one communication channel between a customer and a company 730; computer code for implementing a survey tool application, terminal or device to the customer using the at least one communication channel, wherein the survey tool is saved on, executed from or on, stored on or located on a portable media storage device, a hand held device, a tablet computer, a laptop computer, a desk top computer, a network service, an internet server, the cloud or a combination thereof 740; computer code to capture data corresponding to actual use of survey tools to access accountability queries, satisfaction queries and security queries; wherein captured data from the survey tool in a database is saved on, executed from or on, stored on or located on a portable media storage device, a hand held device, a tablet computer, a laptop computer, a desk top computer, a network service, an internet server, the cloud or a combination thereof 750; computer code for completing a plurality of data records from the survey tools to produce a dashboard application that shows real-time information and metrics related to the accountability query, security query, customer satisfaction, the employee satisfaction and the at least one strategic goal, wherein the customer satisfaction information and the employee satisfaction information are derived directly from a specific customer and a specific employee interaction with one another 760, and wherein the dashboard application is saved on, executed from or on, stored on or located on a portable media storage device, a hand held device, a tablet computer, a laptop computer, a desk top computer, a network service, an internet server, the cloud or a combination thereof 770; a computer-implemented executable software application, comprising providing real-time customer, patient or consumer metrics and employee metrics on the dashboard application, wherein the software application is saved on, executed from or on, stored on or located on a non-transitory computer readable medium, including a portable media storage device, a hand held device, a tablet computer, a laptop computer, a desk top computer, a network service, an internet server, the cloud or a combination thereof 780; wherein the software application is utilized to convert the captured data to the at least one metric; and providing at least one reward tool for the at least one customer, providing at least one reward tool for an at least one individual employee of the company, wherein the reward tool for the at least one individual employee is directly related to the individual employee's satisfaction or accomplishment 790, and wherein the at least one reward tool for the at least one customer is related to the at least one reward tool for the at least one employee 800.

In addition, computer-implemented methods for providing real-time customer, patient or consumer and employee metrics 600 include: providing at least one strategic goal 610; providing at least one metric associated with the at least one strategic goal 620; providing at least one communication channel between a customer and a company 630; providing at least one communication code 640; utilizing the at least one communication code to access the at least one communication channel 650; providing a survey tool to the customer using the at least one communication channel 660; capturing data from the survey tool in a database 670; converting the captured data to the at least one metric 680; and providing the at least one metric on a dashboard application 690. This method is shown in FIG. 6. A software application that implements the computer-implemented method disclosed is also contemplated.

FIG. 1 shows an outline of the strategic approach and process 100 at a glance for a contemplated platforms, software and method that can be used with consumers and/or customers. This approach can also be utilized in the health care industry with a minimum of revisions. The overall contemplated process includes six basic steps: a) baseline assessment 110, b) identify employee and business goals 120, c) create measurement tools 130, d) design the specific program for the business or business model 140, e) deliver and communicate program 150, and f) program evaluation 160.

As part of these contemplated computer-implemented methods for providing real-time customer, patient or consumer and employee metrics, at least one strategic goal should be provided. These strategic goals may be any one or collection of goals that are important to the business or industry in the short-term, long-term or combination thereof. Contemplated strategic goals may be directed to a new product or service or may be directed to overall quality and performance. For example, some contemplated strategic goals may be to increase repeat business from consumers, improve customer satisfaction with a product or service, capture specific employee performance information, capture information regarding a specific location, region or state, or combinations thereof. These are the goals that most businesses develop as part of a business plan for the year or as part of a strategic plan. The key question is how these goals can be addressed, broken down and achieved. This contemplated process is included in a baseline assessment, which may include reviewing the business strategies, the business goals, executive compensation and sponsorship, the organizational culture—both inside and outside of the organization—and the organizational impacts—both inside and to the relevant community.

In contemplated embodiments, once at least one strategic goal is outlined, at least one metric associated with each of the at least one strategic goal must be provided. A contemplated metric is the number or numbers that indicate whether the "Point A to Point B" of the strategic goal is being achieved within a specific time frame. For example, if one of the strategic goals is to increase repeat business from their consumers, then the baseline must be the group or a random sample group of their known consumers. There may be a six-month period of measuring the activity of these consumers, which may be identified merely as a number or as a set of initials to protect privacy, in order to calculate a baseline for the group. Then, as the company undertakes initiatives and methods to improve the consumer experience or the product, data is collected as to the repeat business of the baseline group of consumers. This process can best be described as creating measurement tools and implementing those measurement tools.

In order to get direct and real-time feedback and input from consumers, customers and/or patients, it is essential to provide at least one communication channel between a customer and a company, clinic or hospital. In some embodiments, the company, clinic or hospital may contract with an outside data collection service to collect the data, and therefore, the at least one communication channel may be provided between the customer and the third-party data collection service. However, the company will still be able to view real time information showing the interaction between the one customer, consumer or patient and the at least one employee, staff member or health care worker who worked with that customer, consumer or patient. The key to the system is the direct measurement of satisfaction between specific consumers and specific employees.

Contemplated communication channels can be telephone or audio, video, Wi-Fi, wireless data transmission, wireless internet, hardwire broadband internet, digital communications, or a combination thereof. It should be understood that any suitable form of connecting a consumer with a company, clinic or hospital is contemplated.

Once the strategic goals, the metrics and the communication channels are provided, it is time to start collecting data. In contemplated methods, the process begins when the consumer is provided a communication code and then utilizes that communication code to access the communication channel. Contemplated communication codes are uniquely generated codes that contain basic information regarding the consumer/business interaction. For example, if the consumer is purchasing a product, the uniquely generated communication code may be a QR code on the receipt that is scanned by a smartphone, a bar code on the receipt or a unique collection of numbers.

One of the keys of contemplated systems is the generation of a unique QR code or unique scannable or readable code for each consumer using the unique code generator that randomly generates a unique code, such as an individual QR code. As mentioned earlier, it is important to note that all QR codes are unique to a user, so that specific customer/employee interaction data can be tracked. In contemplated embodiments, unique QR codes or other unique codes are generated for each potential or actual consumer.

Contemplated unique scannable or readable codes are designed to be scanned or "read" by a portable device, handheld device or combination thereof. A QR code is a subset of the unique scannable or readable codes. As used here, a QR code—abbreviated from Quick Response Code—is a type of matrix barcode (or two-dimensional code) first designed for the automotive industry. More recently, the system has become popular outside of the industry due to its fast readability and large storage capacity compared to standard UPC barcodes. The code consists of black modules arranged in a square pattern on a white background. The information encoded can be made up of four standardized kinds ("modes") of data (numeric, alphanumeric, byte/binary, Kanji), or by supported extensions virtually any kind of data. (www.wikipedia.org)

The communication codes are all associated with basic consumer information, what was purchased, what service was conducted (such as a bank transaction), when, where and what time of day. This information is useful in and of itself, because it captures information about the daily purchases or interaction habits of consumers/patients. When the consumer uses or inputs this code, the data system immediately captures the base information associated with the purchase or service, and then associates that base information with the new "satisfaction" information.

Contemplated "satisfaction" information may be information collected through the completion of a survey or responses to a set of questions. Satisfaction information may also be that information that captures how long a customer spent in line or waiting for assistance, if the business is service oriented. Satisfaction information may be that information that is collected at that one time or may be ongoing information collected as the customer uses the product or comes back again for services. This feature of contemplated embodiments is what is captured or embodied by the survey tool. And in many embodiments, the survey tool is within or operationally connected to a database or other method of storing, accessing and organizing information and data. Satisfaction information may also be collected at the point of service, in that emotional responses, physiological responses or a combination thereof may be collected and utilized in any suitable method.

Contemplated computer-implemented methods, as mentioned, include capturing data, wherein capturing data from the survey tool in a database comprises data that represents information from a consumer interaction with an employee. In some embodiments, capturing data from the survey tool in a database comprises data that represents information from a patient interaction with a health care worker. In other embodiments, capturing data from the survey tool in a database comprises data that represents information from the direct interaction between a consumer and an employee. In yet other embodiments, capturing data from the survey tool in a database comprises data that represents information from the direct interaction between a patient and a health care worker.

Once all of the information is captured, it will need to be converted into the at least one metric. Contemplated data conversions can be accomplished in any suitable way, including direct one-to-one conversion of data, algorithms or combinations thereof.

Figure 2:
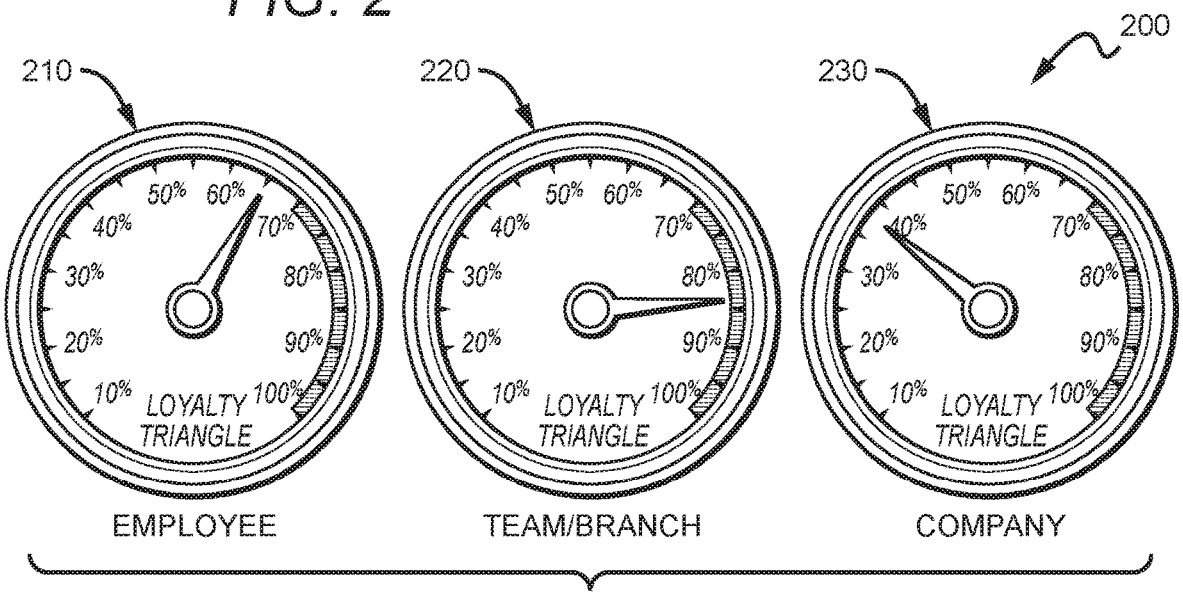
FIG. 2 shows a contemplated dashboard application.

Contemplated embodiments will also include a dashboard application where the at least one metric can be displayed in meaningful form for the employee, company, business, hospital or clinic. A contemplated dashboard application 200 is shown in FIG. 2 where a user can view real-time metrics showing the branch satisfaction, for example, 210, the employee satisfaction 220 and the company satisfaction 230. These applications are designed to give real-time impactful information to the company, business, hospital or clinic on consumer/customer interactions, employee interactions, product and services information and other metrics that will allow the business to determine whether the at least one strategic goal is being met. In contemplated embodiments, this dashboard application is produced from a number of sources—several of which cannot be performed in a conventional form or by someone working on their own without the aid of a computer and associated unconventional steps.

The current claims are related to real-time data capture, interpretation, and transmission as well and a human alone cannot perform the claimed embodiments for a number of reasons including the fact that the claim limitations are tied to a machine.

Contemplated computer-implemented methods also include providing at least one reward tool for the at least one customer, providing at least one reward tool for an at least one employee of the company or a combination thereof. In some embodiments, the at least one reward tool for the at least one customer is related to the at least one reward tool for the at least one employee. In some embodiments, providing the at least one reward tool for the at least one customer comprises at least one reward associated with completion of the at least one survey tool. In other embodiments, providing the at least one reward tool for the at least one employee comprises at least one reward associated with the customer completing the at least one survey tool. In yet other embodiments, providing the at least one reward tool for the at least one employee comprises at least one reward directly associated with the customer completing the at least one survey tool.

Contemplated systems also comprise a handheld device, portable device or combination thereof where the information can be entered on the at least one survey tool, the transaction can take place initially, the dashboard application can be viewed or a combination thereof. Contemplated devices may include a smart phone, hand held device, laptop computer or another suitable device with a network connection, data transfer connection, network data connection, cellular data network and/or connection, Wi-Fi connection, wireless connection, or another suitable device/link combination or connection that allows the user to access the at least one communication channel or allows the employer or manager to view the dashboard application.

Contemplated software platforms can be built for and used on any number of suitable devices and interfaces, including mobile applications and devices, internet applications, network applications, phone and smartphone devices, trade show and convention applications.

In some embodiments, a contemplated handheld device, portable device or combination thereof may comprise a software "app" that is designed to display the dashboard application in real time, and if needed, provide addition information that is related to the dashboard application. As mentioned earlier, in contemplated embodiments and as will be described herein, a unique code generator is designed to randomly generate a unique code that can be associated with a consumer. In some embodiments, a contemplated unique code will be a QR code. A software application that implements the computer-implemented method disclosed is also contemplated. Specifically, a computer-implemented executable software application is included that comprises providing real-time customer, patient or consumer metrics and employee metrics on a dashboard application.

Contemplated systems embodiments and related applications or apps are saved on, executed on, stored on or located on a portable media storage device, a hand held device, a tablet computer, a laptop computer, a desk top computer, a network server, an internet server, the cloud or a combination thereof.

EXAMPLES

Example 1—Contemplated General Application

Contemplated methods can be presented in a number of different ways to a company, clinic or hospital and the following example provides a variety of options available for implementing the contemplated methods.

$1^{st}$ Level: Free Level-Points have No Value-Thanks Only
  Customers thank employees for outstanding service by scanning name
  Scan gives employee points Customers build up points with no value
Companies can see customer interactions but don't have specifics
2nd Level-Small Registration Fee
Companies register and pay monthly fee to see interactions by customer
Companies can send customers instant messages or IMs for each scan
3rd Level-Increased Management Fee
Companies pay increased month fee and get the following:
Real time reports of scans by customers
Statistics on customer satisfaction with each employee
4th Level-Points Management Fee
Companies can pay to link program into their own rewards program and turn points into valuable offerings to customers and employees or can link to an outside rewards program, such as Loyalty Triangle™ reward program
5th Level-Customized Integration Fee TBD
Program is connected to company's internet-based MIS system to determine achievement against goal by employee, lines of business and the company as a whole
Program can be customized to integration full-scale employee engagement program to increase motivation Example 2—Contemplated Specific Application—Financial Institution FIGS. 3-5 show process flow charts for a contemplated method that includes a consumer or customer (FIG. 3), an employee (FIG. 4) and a manager/owner (FIG. 5).

Figure 3:
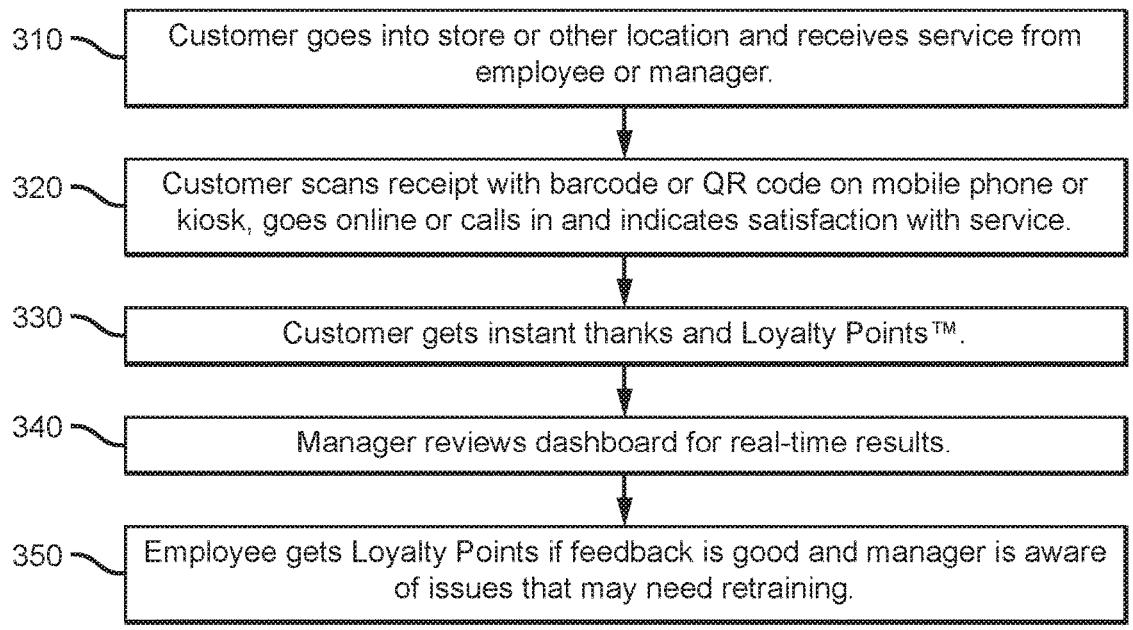
FIG. 3 shows a contemplated method/process from the customer side.

In FIG. 3, the consumer side of the process 300 is shown. A customer goes into a branch location and receives service from an employee or manager 310. After the customer's transaction is completed, he or she receives a receipt with a barcode or QR code on it (not shown). The customer then scans the receipt 320 with the barcode or QR code on a mobile phone or kiosk, goes online or calls in and indicates satisfaction with the service. The customer then gets instant thanks or Loyalty Points 330 added to his or her account. The customer input is then converted into a metric and posted on the business dashboard (not shown). The manager then reviews the dashboard for real-time results 340. The employee gets Loyalty Points if feedback is good and if not, the manager is aware and may need to implement retraining 350.

Figure 4:
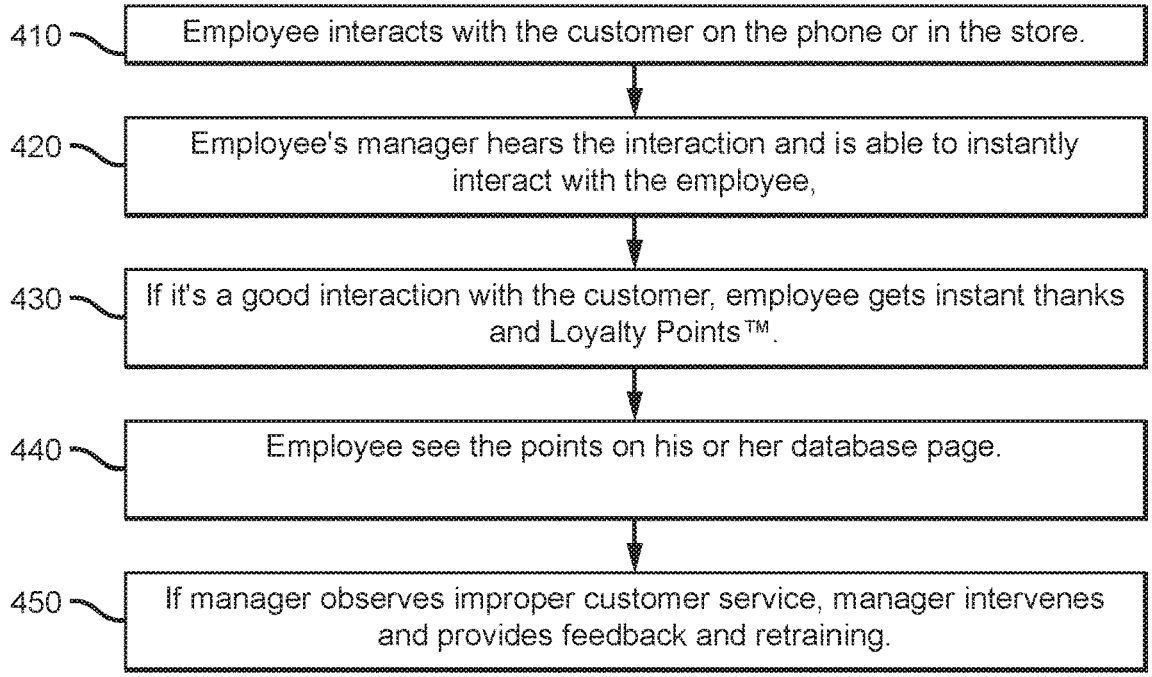
FIG. 4 shows a contemplated method/process from the employee side.

In FIG. 4, the employee side of the process 400 is shown. An employee interacts with the customer in the branch or over the phone 410. After the customer's transaction is completed, he or she receives a receipt with a barcode or QR code on it (not shown). The customer then scans the receipt 420 with the barcode or QR code on a mobile phone or kiosk, goes online or calls in and indicates satisfaction with the service. The employee's manager gets feedback on the interaction and is able to instantly interact with the employee 430. If the interaction is good, the employee gets instant thanks or Loyalty Points 440. The employee sees his or her points on his or her employee page 450. If the manager determines that the service was subpar, the manager intervenes and provides feedback and/or retraining 460.

Figure 5:
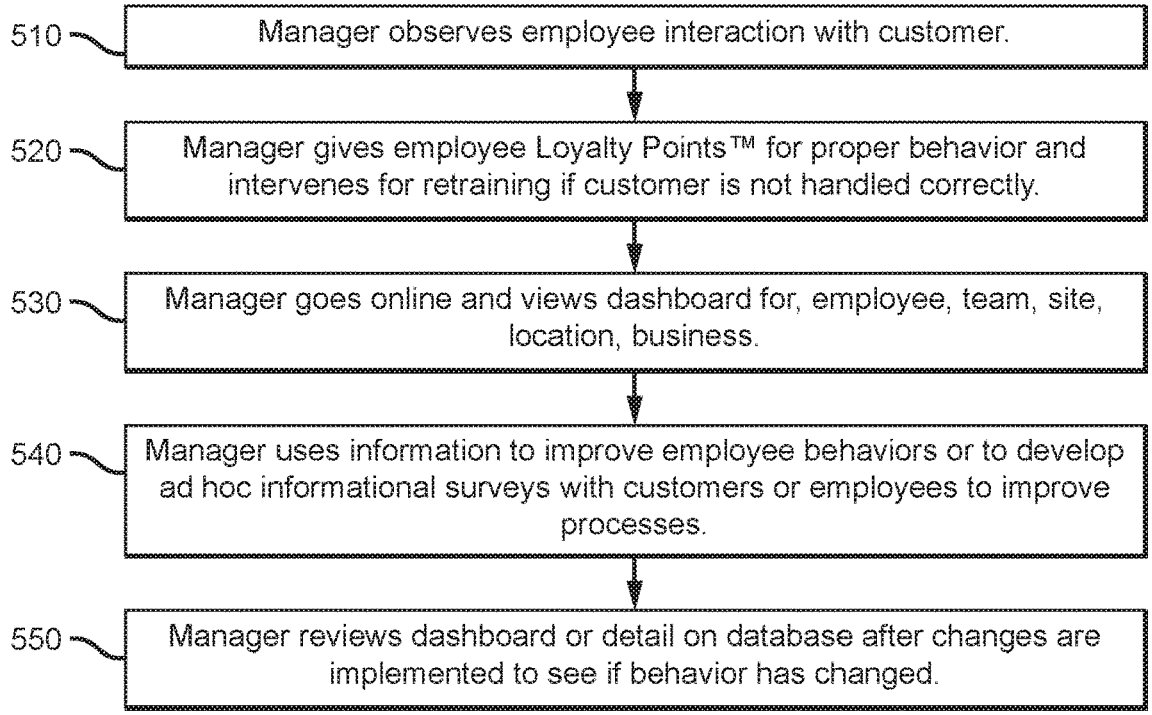
FIG. 5 shows a contemplated method/process from the manager side.

In FIG. 5, the manager side of the process 500 is shown. The manager observes the employee interaction with the customer through a real-time display of the metrics on the dashboard 510. The manager then gives the employee Loyalty Points for proper behavior and intervenes for retraining if the customer is not handled properly 520. The manager goes online and views the dashboard for the employee, team, site, location and/or business 530. The manager uses the information to improve employee behaviors or to develop ad hoc informational surveys with customers or employees to improve processes 540. The manager reviews dashboard or detail on database after changes are implemented to see if behavior has changed 550.

Thus, specific embodiments and applications of employee and customer loyalty and rewards programs, satisfaction metrics and their methods of use have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

We claim:
1. A computer program product stored in a computer readable medium for providing real-time customer, patient or consumer metrics and employee metrics, comprising:
computer code for inputting at least one strategic goal;
computer code for inputting at least one metric associated with the at least one strategic goal;
computer code for collecting network communications data from at least one communication channel between a customer and a company;
computer code for implementing a survey tool application, terminal or device to the customer using the at least one communication channel, wherein the survey tool is saved on, executed from or on, stored on or located on a portable media storage device, a hand held device, a tablet computer, a laptop computer, a desk top computer, a network service, an internet server, a cloud or a combination thereof;
computer code to capture data corresponding to actual use of survey tools to access accountability queries, satisfaction queries and security queries; wherein captured data from the survey tool in a database is saved on, executed from or on, stored on or located on a portable media storage device, a hand held device, a tablet computer, a laptop computer, a desk top computer, a network service, an internet server, the cloud or a combination thereof;
computer code for completing a plurality of data records from the survey tools to produce a dashboard application that shows real-time information and metrics related to the accountability query, security query, customer satisfaction, the employee satisfaction and the at least one strategic goal, wherein the customer satisfaction information and the employee satisfaction information are derived directly from a specific customer and a specific employee interaction with one another, and wherein the dashboard application is saved on, executed from or on, stored on or located on a portable media storage device, a hand held device, a tablet computer, a laptop computer, a desk top computer, a network service, an internet server, the cloud or a combination thereof;

a computer-implemented executable software application, comprising providing real-time customer, patient or consumer metrics and employee metrics on the dashboard application, wherein the software application is saved on, executed from or on, stored on or located on a non-transitory computer readable medium, including a portable media storage device, a hand held device, a tablet computer, a laptop computer, a desk top computer, a network service, an internet server, the cloud or a combination thereof;

wherein the software application is utilized to convert the captured data to the at least one metric;

providing at least one instant reward tool for the at least one customer, providing at least one instant reward tool for an at least one individual employee of the company, wherein the reward tool for the at least one individual employee is directly related to the individual employee's satisfaction or accomplishment, and wherein the at least one reward tool for the at least one customer is related to the at least one reward tool for the at least one employee;

providing at least one training protocol immediately to a manager, if the employee metric is not satisfactory, in order for the manager to implement retraining; and providing immediate feedback to the at least one customer regarding the customer satisfaction information by the manager, including providing information as to the at least one training protocol, if the employee metric is not satisfactory, and providing information regarding employee retraining.

2. A computer-implemented method for providing real-time customer, patient or consumer metrics and employee metrics, comprising:

providing at least one strategic goal;

providing at least one metric associated with the at least one strategic goal;

providing at least one communication channel between a customer and a company;

providing at least one communication code;

utilizing the at least one communication code to access the at least one communication channel;

providing a survey tool to the customer using the at least one communication channel, wherein the survey tool is saved on, executed from or on, stored on or located on a portable media storage device, a hand held device, a tablet computer, a laptop computer, a desk top computer, a network service, an internet server, a cloud or a combination thereof;

capturing data from the survey tool in a database, wherein the database is saved on, executed from or on, stored on or located on a portable media storage device, a hand held device, a tablet computer, a laptop computer, a desk top computer, a network service, an internet server, the cloud or a combination thereof;

producing a dashboard application that shows real-time information and metrics related to the customer satisfaction, the employee satisfaction and the at least one strategic goal, wherein the customer satisfaction information and the employee satisfaction information are derived directly from a specific customer and a specific employee interaction with one another, and wherein the dashboard application is saved on, executed from or on, stored on or located on a portable media storage device, a hand held device, a tablet computer, a laptop computer, a desk top computer, a network service, an internet server, the cloud or a combination thereof;

providing a computer-implemented executable software application, comprising providing real-time customer, patient or consumer metrics and employee metrics on the dashboard application, wherein the software application is saved on, executed from or on, stored on or located on a non-transitory computer readable medium, including a portable media storage device, a hand held device, a tablet computer, a laptop computer, a desk top computer, a network service, an internet server, the cloud or a combination thereof;

utilizing the software application to convert the captured data to the at least one metric;

providing at least one instant reward tool for the at least one customer, providing at least one instant reward tool for an at least one individual employee of the company, wherein the reward tool for the at least one individual employee is directly related to the individual employee's satisfaction or accomplishment, and wherein the at least one reward tool for the at least one customer is related to the at least one reward tool for the at least one employee, providing at least one training protocol immediately to a manager, if the employee metric is not satisfactory, in order for the manager to implement retraining; and providing immediate feedback to the at least one customer regarding the customer satisfaction information by the manager, including providing information as to the at least one training protocol, if the employee metric is not satisfactory, and providing information regarding employee retraining.

3. The computer-implemented method of claim 2, wherein providing the at least one reward tool for the at least one customer comprises at least one reward associated with completion of the at least one survey tool.

4. The computer-implemented method of claim 2, wherein providing the at least one reward tool for the at least one employee comprises at least one reward associated with the customer completing the at least one survey tool.

5. The computer-implemented method of claim 2, wherein providing the at least one reward tool for the at least one employee comprises at least one reward directly associated with the customer completing the at least one survey tool.

6. The computer-implemented method of claim 2, wherein capturing data from the survey tool in a database comprises data that represents information from a consumer interaction with an employee.

7. The computer-implemented method of claim 2, wherein capturing data from the survey tool in a database comprises data that represents information from a patient interaction with a health care worker.

8. The computer-implemented method of claim 2, wherein capturing data from the survey tool in a database comprises data that represents information from the direct interaction between a consumer and an employee.

9. The computer-implemented method of claim 2, wherein capturing data from the survey tool in a database comprises data that represents information from the direct interaction between a patient and a health care worker.

* * * * *